United States Patent
Agrawal et al.

(10) Patent No.: US 10,351,731 B2
(45) Date of Patent: *Jul. 16, 2019

(54) SATURATING WAX COATING COMPOSITION AND ASSOCIATED METHODS OF USE

(71) Applicant: ExxonMobil Research and Engineering Company, Annandale, NJ (US)

(72) Inventors: Sarvesh K. Agrawal, Woolwich Township, NJ (US); Larry E. Hoch, Yardley, PA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 617 days.

This patent is subject to a terminal disclaimer.

(21) Appl. No.: 14/920,095

(22) Filed: Oct. 22, 2015

(65) Prior Publication Data

US 2016/0122588 A1    May 5, 2016

Related U.S. Application Data

(60) Provisional application No. 62/074,168, filed on Nov. 3, 2014.

(51) Int. Cl.
   *C10G 73/36*   (2006.01)
   *C09D 191/06*   (2006.01)
   (Continued)

(52) U.S. Cl.
   CPC ........... *C09D 191/06* (2013.01); *B65D 65/40* (2013.01); *C09D 123/06* (2013.01); *D21H 17/60* (2013.01);
   (Continued)

(58) Field of Classification Search
   CPC ..................................................... C10G 73/36
   (Continued)

(56) References Cited

U.S. PATENT DOCUMENTS

3,146,184 A * 8/1964 Moyer ................ C09D 191/08
                                                              208/21
3,332,926 A   7/1967 Baron, Jr. et al.
                        (Continued)

FOREIGN PATENT DOCUMENTS

WO   2009/012292 A1   1/2009
WO   2012/145333 A1   10/2012
                (Continued)

OTHER PUBLICATIONS

The International Search Report and Written Opinion of PCT/US2015/057034 dated Jan. 19, 2016.
(Continued)

*Primary Examiner* — Ellen M McAvoy
(74) *Attorney, Agent, or Firm* — Scott F. Yarnell

(57) ABSTRACT

Wax compositions are provided with improved properties for various applications, such as coating of corrugated cardboard or other cellulosic paper materials. As described herein, paraffin waxes having a very broad molecular weight distribution are provided, e.g., 95% carbon number spread of at least 18 carbon atoms, which result in wax compositions with a relatively hard needle penetration value, suitable blend kinematic viscosity, and provide equivalent or better wet strength and water proofing properties as compared to waxes currently commercially used in corrugated coating. The paraffin wax compositions described herein also provide a higher congealing point, thereby benefiting the high temperature properties such as oil bleed, appearance and friction coefficient of the corrugating wax coating.

20 Claims, 3 Drawing Sheets

(51) Int. Cl.
  *C09D 123/06* (2006.01)
  *D21H 27/10* (2006.01)
  *D21H 17/60* (2006.01)
  *D21H 19/18* (2006.01)
  *D21H 21/16* (2006.01)
  *B65D 65/40* (2006.01)
  *C08L 91/08* (2006.01)
  *C08L 91/06* (2006.01)
  *D21H 19/22* (2006.01)

(52) U.S. Cl.
  CPC .............. *D21H 19/18* (2013.01); *D21H 21/16* (2013.01); *D21H 27/10* (2013.01); *C08L 91/06* (2013.01); *C08L 91/08* (2013.01); *C10G 73/36* (2013.01); *D21H 19/22* (2013.01)

(58) Field of Classification Search
  USPC .......................................... 585/9; 208/20, 21
  See application file for complete search history.

(56) References Cited

U.S. PATENT DOCUMENTS

| | | | | |
|---|---|---|---|---|
| 4,039,560 | A | 8/1977 | Tomoshige | |
| 4,990,378 | A | 2/1991 | Jones | |
| 5,228,905 | A * | 7/1993 | Grunewalder | A01N 25/04 106/18.29 |
| 5,296,129 | A * | 3/1994 | Ikeda | C08L 7/00 106/270 |
| 7,018,432 | B2 * | 3/2006 | Moussouni | C08L 91/06 106/270 |
| 7,445,648 | B2 * | 11/2008 | Hudson | C11C 5/002 208/21 |
| 8,957,148 | B2 * | 2/2015 | Addcox | A61F 13/51462 524/487 |
| 2009/0043140 | A1 * | 2/2009 | Yang | C07C 6/04 585/277 |
| 2012/0263963 | A1 * | 10/2012 | Mahoney | C04B 28/14 428/484.1 |
| 2016/0222251 | A1 * | 8/2016 | Agrawal | C08J 7/047 |
| 2016/0264780 | A1 * | 9/2016 | Agrawal | C08L 91/06 |
| 2017/0247573 | A1 * | 8/2017 | Agrawal | B27N 7/005 |
| 2017/0267869 | A1 * | 9/2017 | Doddema | C09J 9/00 |

FOREIGN PATENT DOCUMENTS

| | | |
|---|---|---|
| WO | 2013/027958 A1 | 2/2013 |
| WO | 2014/120476 A1 | 8/2014 |

OTHER PUBLICATIONS

Young, Francis X., "Practical Applications of Gas Chromatography in the Paint and Coatings Industry," Analysis of Paints and Related Materials: Current Techniques for Solving Coating Problems, American Society for Testing and Materials (ASTM), 1992, ASTM STP 1119, pp. 105-124.

Aubee, Norman et al., "A New Family of sHDPE Polymers for Enhanced Moisture Barrier Performance," Journal of Plastic Film and Sheeting, 2006, vol. 22, pp. 315-330.

Meyer, Gernot, "Interactions between Chain Length Distributions, Crystallization behaviour and Needle Penetration of Paraffin Waxes," Erdol-Erdgas-Kahle Journal, 2006, vol. 122, No. 1, pp. 16-18.

Todd, William G., "Variables that Affect/Control High-Density Polyethylene Film Oxygen-Moisture Barrier," Journal of Plastic Film and Sheeting, 2003, vol. 19, pp. 209-220.

* cited by examiner

SATURATING WAX COATING COMPOSITION AND ASSOCIATED METHODS OF USE

CROSS-REFERENCE TO RELATED APPLICATIONS

This application claims priority to U.S. Provisional Application Ser. No. 62/074,168 filed Nov. 3, 2014, which is herein incorporated by reference in its entirety.

FIELD

Systems and methods are provided for forming a wax coating composition, e.g., for use with cellulosic surfaces.

BACKGROUND

Coated paper products, such as wax-coated corrugated cardboard boxes, are used in a variety of applications. Traditionally, wax coatings modified with polymers have found a significant use in this application. Wax coating compositions on paper products provide a barrier to moisture as well as oil and grease. For example, wax-coated corrugated cardboard can be used to make poultry boxes and other types of boxes that are used to carry and transport frozen and ice packed seafood, poultry, fruits and vegetables. A wax coating composition on these boxes not only provides rigidity and strength to these boxes but also water proofing to the boxes when they are exposed to wet and frozen food products during transportation that ultimately protects the mechanical integrity of the boxes during transportation.

For wax compositions used in coating corrugated products, it is typical to use high quality paraffin waxes with a narrow molecular weight range or narrow carbon number distribution (e.g., 95% carbon number spread), and a high n-paraffin (i.e., straight-chain paraffin) content. Rationalization of Group I base stock refining capacity around the globe has led to a declining availability of corresponding wax streams that are derived from these base stocks. However, with a reduction in available sources of wax, it has become ever more important to have the flexibility of blending different wax streams without a concomitant deterioration in product properties. However, blending of wax streams with widely different molecular weights or widely different average carbon numbers is well-known to generally have a negative effect on product properties. More specifically, for use in corrugated cardboard coatings and more specifically in saturating waxes, only high quality, narrow molecular weight cut, fully-refined paraffin waxes are preferred.

It is well-known in the art that a narrow molecular weight distribution of molecules is beneficial for several key properties, including, inter alia, improved water-proofing, hardness, and oil bleed, among others. For example, wax with a wide carbon number distribution is known to be detrimental to the quality of the wax and causes "oil bleed" (Young, F. X. "Practical Applications of Gas Chromatography in Paints and Coatings Industry," Analysis of Paints and Related Materials: Current Techniques for Solving Coating Problems, American Society for Testing and Materials (ASTM), Philadelphia, 1992, ASTM STP 1119, p 105-124). Oil bleed is the tendency of a wax to have a slick-oily surface and is related to poor wax quality and poor water proofing. Oil bleed in a coating product may provide poor surface characteristics to the coating in terms of poor appearance and lower friction coefficient of the slick coated surface. Similarly, a narrow distribution of carbon lengths and a narrow distillation cut is necessary for production of a high quality wax having sufficient hardness, especially at higher temperatures (Meyer, G. "Interactions between chain length distributions, crystallization behavior and needle penetration of paraffin waxes," Erdol-Erdgas-Kohle Journal, 2006, 122.Jb, 1, S.16-18). Finally, the literature has described how increasing molecular weight distribution leads to a decrease in crystal perfection of crystalline materials, which in turn is directly responsible for reduction in barrier properties and water proofing of the material.

For the same reasons, high n-paraffin content is desired in waxes that are used in water proofing applications. High n-paraffin content tends to give a higher percentage of crystalline phase in the material, which in turn is responsible for good barrier properties of the material among other desirable characteristics. It is for this reason that synthetic waxes are desired to be made with narrow molecular weight distributions.

The hardness of the wax coating is also important in corrugated box coatings because harder wax coatings translate into a harder box which gives the box greater 'dry strength', which is needed for greater stacking strength. Stacking strength is required for such corrugated boxes because they are used to pack and transport heavy loads for fruits, meat and vegetables over long distances. In particular, the ability of the wax to maintain its stacking strength in warmer temperatures is also an important characteristic, since often food packaging is done in warmer climates. For this attribute, the ability of the wax to maintain its hardness at higher temperatures is highly desirable.

Several studies have attributed improved barrier properties of polymeric materials, in particular high density polyethylene, to a narrow molecular weight distribution of the polymer. Since the molecular architecture and crystallization behavior of polyethylene is similar to a paraffin wax molecule, the effect of molecular weight distribution on barrier properties of the material is expected to be similar by inference.

Competing with the ongoing need for wax materials, including those suitable for use in coating cellulosic materials, is the fact that the wax obtained from Group I refining process, which includes high-quality and mid and low carbon number paraffin waxes, are more and more frequently consumed for the production of lubricants. Moreover, lower quality paraffin waxes are also recycled and further processed for further lubricant production. As such, there exists in the art a need for the wax materials that demonstrate properties suitable for industrial use, e.g., coatings for cellulosic materials, candles, writing implements, etc. but that can be produced with refinery wax streams that have better long term availability such as higher carbon number paraffins.

SUMMARY

Presently described are wax compositions and methods for making and using the same. As described herein, it was surprisingly discovered that paraffin waxes having a very broad molecular weight distribution could result in wax compositions having a relatively hard needle penetration value, suitable blend kinematic viscosity, and provide equivalent or better wet strength and water proofing properties as compared to waxes commercially used in corrugated coating. It was also surprisingly observed that these waxes provide improved dry strength properties and improved hardness at higher temperatures compared to commercial wax products sold for this application. The paraffin wax compositions described herein also provide a higher congealing point, thereby benefiting the high temperature properties such as oil bleed, appearance and friction coefficient of the corrugating wax coating.

Thus, in one aspect, the disclosure provides a wax composition comprising paraffin waxes having a 95% carbon number spread of at least 18 carbon atoms. In certain embodiments, the wax composition comprises at least 5% by weight (i.e., wt. %) of paraffin waxes having a carbon number of 24 or less (i.e., ≤C24). In certain embodiments, the wax composition comprises at least 5% by weight (i.e., wt. %) of paraffin waxes having a carbon number of 38 or more (i.e., ≥C38). In certain embodiments, the wax composition comprises at least 15% by weight (i.e., wt. %) of paraffin waxes having a carbon number of 34 or more (i.e., ≥C34). In still additional embodiments, the wax composition comprises a total n-paraffin content of less than 76% by weight.

In certain embodiments, the wax composition comprises a sufficient amount of paraffin waxes having a 95% carbon number spread of at least 18 carbon atoms, wherein the distribution of waxes is sufficient to effectuate or provide a wax composition having a needle penetration value at 40° C. (i.e., 104° F.) of about 90 dmm or less (i.e., ≤90 dmm) based on ASTM D-1321.

In additional embodiments, the wax composition comprises paraffin waxes having a 95% carbon number spread of at least 18 carbon atoms, with a distribution of waxes sufficient to provide a wax composition having a total wax blend kinematic viscosity of about 7.5 cSt or less (i.e., ≤7.5 cSt) at 100° C. In certain embodiments, the blend wax kinematic viscosity is from about 4.3 cSt to about 7.5 cSt at 100° C.

In any of the embodiments of wax compositions described herein, the wax composition can further comprise at least one additive. In certain embodiments, the additive is a polymer or co-polymer, including, e.g., functionalized versions of the same, an inorganic material, including, e.g., a clay or ceramic material, or a synthetic wax material. In certain embodiments, the polymer is polyethylene. In additional embodiments, the wax composition comprises from about 0.01% to about 10% polyethylene. In certain additional embodiments, the wax composition comprises about 2% by weight polyethylene.

In an additional aspect, the disclosure provides a cellulosic material coated with a wax composition as described herein. In certain embodiments, the cellulosic material is completely saturated or coated with the wax composition. In additional embodiments, the cellulosic material is partially coated. In certain embodiments, the description provides a wax coated cellulosic article comprising a cellulosic surface including from about 25% by weight to about 45% by weight of a wax coating as described herein. In certain embodiments, the wax coated cellulosic article is a corrugated cardboard material.

In an additional aspect, the disclosure provides items formed from the wax compositions as described herein. In certain embodiments, the wax items include a candle or a crayon.

In an additional aspect, the disclosure provides methods of making the wax compositions as described herein.

In still an additional aspect, the disclosure provides methods of using the wax compositions as described herein. In certain embodiments, the disclosure provides a method of forming a wax-coated article or material comprising providing the item and applying a coating of the wax composition as described herein. In certain embodiments, the disclosure provides a method of forming a wax-coated cellulosic material comprising providing a cellulosic article or material having a surface, forming or providing a wax composition as described herein and applying the wax composition to the cellulosic article or material. In certain embodiments, the cellulosic material is saturated with the wax composition. In certain additional embodiments, the cellulosic material is partially coated. In any of the embodiments described herein, the cellulosic material is corrugated cardboard.

Where applicable or not specifically disclaimed, any one of the embodiments described herein are contemplated to be able to combine with any other one or more embodiments, even though the embodiments are described under different aspects of the disclosure.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional advantages objects and embodiments are expressly included within the scope of the present disclosure. The publications and other materials used herein to illuminate the background of the disclosure, and in particular cases, to provide additional details respecting the practice, are incorporated by reference, and for convenience are listed in the appended bibliography.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the disclosure. Further objects, features and advantages of the disclosure will become apparent from the following detailed description taken in conjunction with the accompanying figures showing illustrative embodiments of the disclosure, in which.

DETAILED DESCRIPTION

Figure 1:
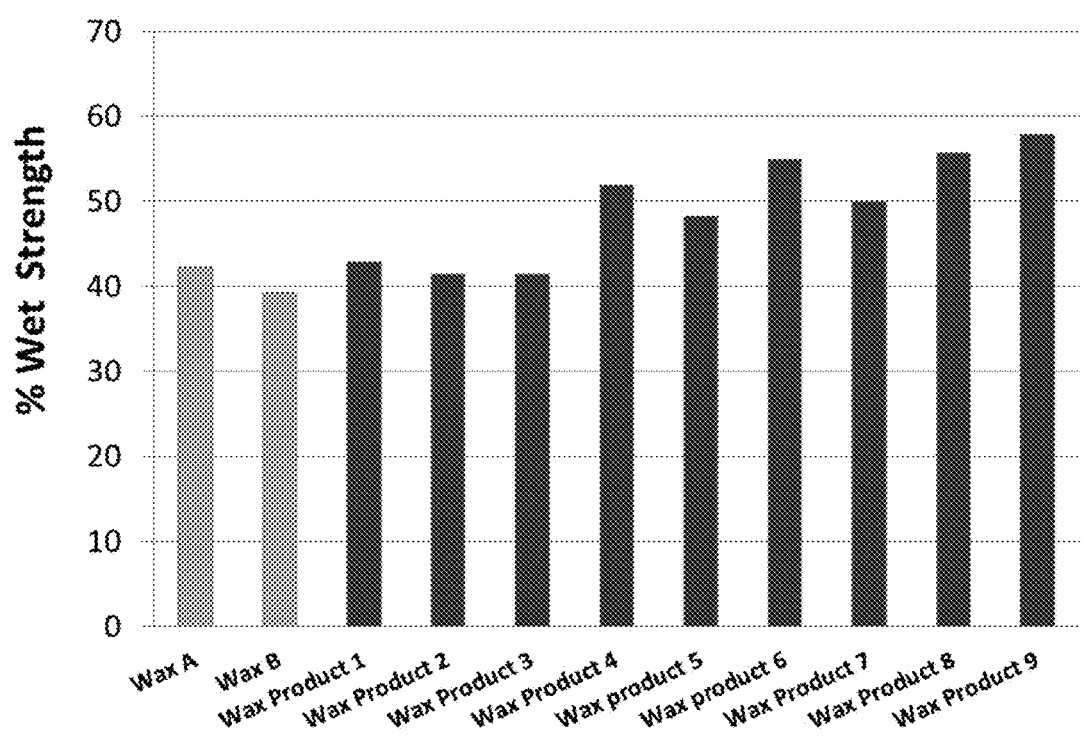
FIG. 1. Illustrates the wet strength properties of exemplary wax compositions as described herein ("Wax Products" 1, 2, 3, 4, 5, 6, 7, 8 and 9) in comparison to commercially available products, "Wax A" and "Wax B."

Presently described are wax compositions, and methods for making and using the same. As described herein, it was surprisingly discovered that paraffin waxes having a very broad molecular weight distribution could result in relatively hard wax compositions (i.e., wax compositions having a relatively hard needle penetration value), suitable blend kinematic viscosity, and provide equivalent or better wet strength and water proofing properties as compared to waxes commercially used in corrugated coating. It was also surprisingly observed that these waxes provide improved dry strength properties and improved hardness at higher temperatures compared to commercial wax products sold for this application. The paraffin wax compositions described herein also provide a higher congealing point, thereby benefiting the high temperature properties such as oil bleed, appearance and friction coefficient of the corrugating wax coating.

Conventional wisdom in the art was that a narrow carbon number distribution of the wax molecules is beneficial or required for improved water proofing characteristics of the wax, and a wax with an unusually broad molecular weight distribution as described herein would be detrimental to performance, for example, water barrier performance, hardness and wax oil bleed. As such, based on conventional wisdom, the wax compositions described herein would have been expected to impart poor wet strength, dry strength, water proofing, and appearance characteristics to a wax coated cardboard box.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure. All publications, patent applications, patents, figures and other references mentioned herein are expressly incorporated by reference in their entirety.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

It should also be understood that, unless clearly indicated to the contrary, in any methods claimed herein that include more than one step or act, the order of the steps or acts of the method is not necessarily limited to the order in which the steps or acts of the method are recited.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The term "about" or "approximately" means an acceptable error for a particular value as determined by one of ordinary skill in the art, which depends in part on how the value is measured or determined. All numerical values within the detailed description and the claims herein are modified by "about" or "approximately" the indicated value, and take into account experimental error and variations that would be expected by a person having ordinary skill in the art.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of and "consisting essentially of shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As indicated above, coating compositions to provide a moisture as well as oil and grease barrier are commonly used on paper products. Traditionally, wax coatings modified with polymers have found a significant use in this application. However, with a reduction in available sources of wax, it has become ever more important to have the flexibility of blending different wax streams without deterioration in product properties. However, blending of wax streams with widely different molecular weights or widely different average carbon numbers is well known to generally have a negative effect on product properties. More specifically, for use in corrugated cardboard coatings and more specifically in saturating waxes, only high quality, narrow molecular weight cut, fully refined paraffin waxes have been preferred.

Described herein are paraffin wax compositions suitable for a number of uses and applications, including, for example, for making a coating for cellulosic materials that provides improved strength to the cellulosic materials as well as equivalent or improved water proofing characteristic is disclosed. Specifically, the present description provides a unique set of wax compositional parameter specifications that surprisingly provide improved properties for use of the wax blend composition for coating corrugated cardboard boxes.

Paraffin wax is a white or colorless soft solid derivable from crude by distillation. The feedstock for paraffin is slack wax, which is a mixture of oil and wax, a byproduct from the refining of lubricating oil. The first step in making paraffin wax is to remove the oil (de-oiling or de-waxing) from the slack wax. The oil is generally separated through crystallization. Most commonly, the slack wax is heated, mixed with one or more solvents such as a ketone and then cooled. As it is cooled, wax crystallizes out leaving oil in solution. This mixture is filtered into two streams: solid (wax plus some solvent) and liquid (oil and solvent). After the solvent is recovered by distillation The resulting products are called "hard wax" and "foots oil". The lower the percentage of oil in the wax the more refined it is considered (semi-refined versus fully refined). The product wax may be further processed to remove colors and odors.

Lower molecular weight paraffins typically have a lower boiling point, while higher molecular weight paraffins typically have a higher boiling point. Therefore, separation of paraffins by the carbon number is possible through distillation. However, higher carbon number fractions or cuts typically have a higher 95% carbon number spread (i.e., there is a wider distribution in the carbon number in the higher molecular weight or higher carbon number fractions). The 95% carbon number spread is a measure of the distribution in the carbon number of paraffins in the wax around the average carbon number. For example, low molecular weight paraffins, e.g., C27 or C28 typically have a 95% carbon number spread of approximately 12.3; whereas, a high molecular weight paraffin, e.g., C38, typically has a 95% carbon number spread of approximately 22.5.

Paraffins (general formula $C_nH_{2n+2}$; wherein n=1 through 400) are a mixture of hydrocarbons containing from about 10 to about 100 carbon atoms per molecule. Paraffin waxes can be composed of either straight chains (i.e., normal or n-paraffins), branched chains (i.e., isoparaffins) or cyclic paraffins. Most of the molecules in paraffin wax derived from naturally occurring crude oils are normal paraffins and isoparaffins. Paraffin wax is solid at room temperature and begins to melt above approximately 37° C. (99° F.); its boiling point is >370° C. (698° F.).

Common applications for paraffin wax compositions, including the paraffin wax compositions described herein, include lubrication, electrical insulation, sealants, food additives and coatings, candles, wax crayons, and saturating wax coatings of cellulosic materials. Anti-caking agent, moisture repellent, and dustbinding coatings for fertilizers; agent for preparation of specimens for histology; bullet lubricant—with other ingredients, such as olive oil and beeswax; phlegmatizing agent, commonly used to stabilize/desensitize high explosives such as RDX; solid propellant for hybrid rocket motors; component of surfwax or glidewax; friction-reducer, for use on handrails and cement ledges; ink; glazing agent; forensic tests; antiozonant agents: a release agent, helping the product separate from its mold; mechanical thermostats and actuators, as an expansion medium for activating such devices; wax baths for beauty and therapy purposes; thickening agent in paintballs; moisturiser in toiletries and cosmetics; protectant from metal oxidation; phase change material for thermal energy storage; among others.

In one aspect, the disclosure provides a wax composition comprising paraffin waxes having a 95% carbon number spread of at least 18 carbon atoms. As used herein, the "95% carbon number spread" is calculated as:

$$95\% \text{ carbon number spread} = (\text{standard deviation of the total distribution}) * (1.96) * (2).$$

In certain embodiments, a wax composition is provided wherein the 95% carbon number spread is at least 18, 19, 20, 21, 22, 23, 24, 25, 26 or more.

In general, paraffin wax hardness correlates with carbon number as well as carbon number distribution. For example, a higher carbon number and/or a tighter carbon number distribution gives a higher quality and better hardness profile wax. Similarly, a lower oil content in the paraffin wax results in increased hardness due to the fact that oil inhibits crystallinity. Normal-paraffins also improve hardness as compared to isoparaffins.

In certain embodiments, the wax composition comprises paraffin waxes having a 95% carbon number spread of at least 18 carbon atoms, wherein the paraffin carbon number distribution is sufficient to provide a needle penetration value at 40° C. (i.e., 104° F.) of about 90 dmm or less (i.e., ≤90 dmm). In certain embodiments, the wax composition comprises a mixture of paraffins having different carbon number distributions, for example, at least two distributions selected from the group consisting of C10, C11, C12, C13, C14, C15, C16, C17, C18, C19, C20, C21, C22, C23, C24, C25, C26, C27, C28, C29, C30, C31, C32, C33, C34, C35, C36, C37, C38, C39, C40, C41, C42, C43, C44, C45, C46, C47, C48, C49, C50, C51, C52, C53, C54, C55, C56, C57, C58, C59, C60 and combinations thereof, wherein the mixture provides a wax composition having a needle penetration value at 40° C. (i.e., 104° F.) of about 90 dmm or less (i.e., ≤90 dmm).

In certain embodiments, the wax composition comprises at least 5% by weight (i.e., wt. %) of paraffin waxes having a carbon number of 24 or less (i.e., ≤C24). In certain embodiments, the wax composition comprises at least 5% by weight (i.e., wt. %) of paraffin waxes having a carbon number of 38 or more (i.e., ≥C38). In certain embodiments, the wax composition comprises at least 15% by weight (i.e., wt. %) of paraffin waxes having a carbon number of 34 or more (i.e., ≥C34). In still additional embodiments, the wax composition comprises a total n-paraffin content less than about 76% by weight. It generally understood by skilled artisans that higher n-paraffin content is understood to provide better water proofing. Thus, the compositions as described herein are surprising and unexpected for at least this additional reason.

In certain embodiments, the wax composition comprises at least 5% by weight (i.e., wt. %) of paraffin waxes having a carbon number of 24 or less (i.e., ≤C24), at least 5% by weight (i.e., wt. %) of paraffin waxes having a carbon number of 38 or more (i.e., ≥C38), at least 15% by weight (i.e., wt. %) of paraffin waxes having a carbon number of 34 or more (i.e., ≥C34), and a total n-paraffin content of at least 76% by weight, wherein the paraffin waxes have a 95% carbon number spread of at least 18 carbon atoms, and wherein the wax composition has a needle penetration value at 40° C. (i.e., 104° F.) of about 90 dmm or less (i.e., ≤90 dmm).

In any of the embodiments described herein, the wax composition comprises paraffin waxes having a 95% carbon number spread of at least 18 carbon atoms, with a distribution of waxes sufficient to provide a wax composition having a total wax blend kinematic viscosity of about 7.5 cSt or less (i.e., ≤7.5 cSt) at 100° C. In certain embodiments, the blend kinematic viscosity is from about 4.3 cSt to about 7.5 cSt at 100° C.

In certain embodiments, at least a portion of the paraffins in the paraffin wax composition is modified, e.g., by adding branching to the existing carbon backbone chain to modify the crystal properties of the paraffin wax. The modification is usually done with additives, such as EVA copolymers, microcrystalline wax, or forms of polyethylene. The branched properties result in a modified paraffin with a higher viscosity, smaller crystalline structure, and modified functional properties.

In any of the embodiments of wax compositions described herein, the wax composition can further comprise at least one additive. In certain embodiments, the additive is a polymer or co-polymer, including, e.g., functionalized versions of the same, an inorganic material, including, e.g., a clay or ceramic material, or a synthetic wax material. In certain embodiments, the polymer is polyethylene. Polymers also contribute to the hardness of the resulting wax composition. In additional embodiments, the wax composition comprises from about 0.01% to about 10% polyethylene. In certain additional embodiments, the wax composition comprises about 2% by weight polyethylene.

It is believed that viscosity increases in proportion to the square of the polymer additive concentration, according to the relationship $$\frac{\mu - \mu_0}{\mu_0} = [\mu]C + kC^2,$$

wherein $\mu$ is the viscosity of the wax plus polymer additive composition, $\mu_0$ is the viscosity of the wax, $[\mu]$ is the intrinsic viscosity, C is the concentration of the polymer additive, and k is a constant that can be determined by curve fitting.

In various aspects, wax compositions are provided with improved properties for various applications, such as coating of corrugated cardboard or other cellulosic paper materials. In addition to wax as described herein, the compositions can include a polymer, for example, a polymer with a hydrophobic backbone that is "functionalized" to incorporate a limited percentage of hydrophilic groups. The compositions can optionally also include inorganic nanoparticles, such as clay particles. Improvements in wax properties can be achieved by using small amounts of the functionalized polymer and the optional inorganic (clay) nanoparticles.

For example, the functionalized polymer, the amount of polymer added to the wax composition can be less than about 5 wt % of the composition. Additionally, the amount of the functionalization of the polymer can be limited, so that the polar functional groups grafted or otherwise incorporated into the polymer to "functionalize" the polymer represent about 0.4 wt % to about 6 wt % of the weight of the functionalized polymer. For the optional inorganic particles, the amount of particles added to the wax composition can also be a reduced or minimized amount, such as about 0.001 wt % to about 0.5 wt % of the wax composition.

In conventional methods for incorporating polymers or nanoparticles into a wax, the challenge has been to add a sufficiently high amount of polymer and/or a sufficiently high amount of nanoparticles to a wax in order to achieve a desired property modification without harming other features of the wax. For polymer addition, incorporation of large amounts of polymer into a wax composition is generally not difficult, as waxes and polymers both typically have substantial amounts of hydrophobic character. This can allow many waxes and polymers to be miscible in various amounts. However, addition of substantial amounts of polymer to a wax composition can create difficulties. In addition to increasing the cost of a wax composition, polymer additives for wax compositions can increase the viscosity of the composition. An increased viscosity can lead to difficulties in applying a desired amount of wax to a surface, such as a cardboard surface. When attempting to apply the wax composition to a cardboard surface or a surface of another cellulosic material, the increased viscosity can create difficulties in creating a coating that is both thin and sufficiently continuous to provide improved water resistance to the underlying material. For example, wax is typically applied to cardboard for packing boxes by applying the wax to a substantially vertically-oriented surface and allowing gravity to pull the wax across the surface of the cardboard. At higher viscosities, the coating thickness required to maintain a substantially continuous coating is greater, thus requiring an increased amount of the wax to coat a given surface. Higher viscosities can also require higher processing temperatures during application of the wax.

Addition of nanoparticles to a wax to form a nanoparticle/wax composition can present a different set of problems. Clay nanoparticles and/or other types of particles are typically not "miscible" with waxes. As a result, instead of dispersing throughout a wax (or the wax dispersing in the nanoparticles), the nanoparticles and wax can have a tendency to aggregate. This can lead to a composition with distinct phases having different properties, as opposed to a (relatively) uniform wax composition having a desired set of properties. Modification of surfaces of the nanoparticles with hydrophobic polymers can improve the miscibility of nanoparticles with a wax to form a composition.

It has been discovered that addition of small or minimized amounts of polymer and/or nanoparticles can result in substantial improvements in the properties of a wax composition. Instead of adding comparable amounts of wax and polymer according to a conventional method, the amount of polymer added to a wax can be limited to a few percent of the composition. Similarly, it has been determined that reduced or minimized amounts of nanoparticles (fractions of a weight percent) can be used to achieve a desired modification of the properties of a wax composition.

The polymer added to a wax can correspond to a modified or functionalized polymer, such as a polymer comprised of a hydrophobic backbone with hydrophilic functionality grafted to the backbone and/or incorporated into the polymer during polymerization. Such modification of a polymer can provide further benefits when incorporating the polymer into a wax composition. It has further been determined that a reduced or minimized amount of modification to a polymer can be used to achieve a desired result.

With regard to the clay particles, use of the reduced or minimized amount of particles as described herein can also be beneficial for maintaining a lower viscosity for the resulting composition. Additionally, the amounts of clay particles described herein can reduce or minimize difficulties with incorporating the clay into the composition. At higher amounts of clay particles, in addition to providing reduced benefits for coating properties, the clay particles may not be sufficiently compatible with the wax/polymer portion of the composition. This can lead to problems such as localized phase separation behavior, leading to further potential degradation of coating properties.

In this discussion, the "percent wet strength" or "wet strength" of a coated cellulosic sample refers to the compressive force required to rupture a sample when the sample is waxed and wetted in water, in comparison to a dry unwaxed sample of the same cellulosic material. The wet strength is reported as a percentage, based on the percentage of the strength of the unwaxed sample that is retained when the sample is waxed and wetted.

In various aspects, the composition can include a wax and a polymer that has been functionalized for improving the properties of the composition. The wax in the composition can be a mineral wax such as paraffin wax or microwax (microcrystalline wax); vegetable or animal derived biowax; synthetic wax such as Fischer-Tropsch wax or polyethylene wax; semi-crystalline waxes; or combinations of two or more waxes and/or two or more types of waxes. In some aspects, the wax can include at least about 50 wt % of a paraffin wax, or at least about 60 wt %, or at least about 70 wt %. The kinematic viscosity of the wax, prior to combination with a polymer additive and/or nanoparticles, can be about 10 cSt or less at 100° C., or about 8 cSt or less, or about 6 cSt or less. Preferably, the viscosity of the wax at 100° C. can be at least about 3.0 cSt prior to incorporation of polymer additive and/or nanoparticles.

Examples of polymer waxes can include polyethylene waxes, polypropylene waxes, Fischer-Tropsch waxes, polymerized alpha-olefins waxes, polyethylene-block-polyethylene glycol waxes, and polyethylene mono-alcohol waxes. Microcrystalline waxes typically comprise isoparaffinic, naphthenic and n-alkane saturated hydrocarbons. Microcrystalline waxes can have a melt point from about 54° C. to about 99° C. and a melt viscosity at 99° C. of about 8 to about 25 centipoise. Microcrystalline waxes can have an oil content from about 0.5 wt % to about 12 wt %. Paraffin waxes can include from about 3 0 wt % to about 100 wt % n-alkane straight chain saturated $C_{20}$- to $C_{60}$-hydrocarbons. The paraffin waxes can have a melt point typically from about 35° C. to about 85° C., a melt viscosity at 99° C. commonly of about 2 centipoise to about 15 centipoise, and typically contain less than about 25 wt % oil. Examples of semi-crystalline waxes include without limitation, polyethylene-block-polyethylene glycol waxes, polyethylene monoalcohol waxes, and mixtures thereof. Petroleum waxes are yet another type of wax. Petroleum waxes comprise a mixture of paraffin and microcrystalline waxes.

A polymer additive can be incorporated into the wax composition. Modifications of the polyethylene based polymer can also have an impact on the water proofing characteristics of the wax coatings. The polymer additive can have a hydrophobic backbone for good miscibility with the wax. The polymer additive can also be functionalized with polar functional groups, to improve the interaction of the wax composition with hydrophilic surfaces, such as paper surfaces or the surfaces of clay nanoparticles. The backbone of the polymer additive can be any convenient type of polymer that has a primarily hydrophobic character, such as polyethylene. A polymer backbone having a primarily hydrophobic character is defined as a polymer backbone that, prior to functionalization, is soluble in paraffin wax. Suitable polymer backbones can include homopolymers and/or polymers having multiple types of "mer" units. Examples of suitable polymer backbones can include polypropylene, polystyrene, polyethylene. Introduction of the polar groups into a polymer with a primarily hydrophobic backbone can improve the bonding between the polymer and a cellulosic surface, such as a cardboard surface. Without being bound by any particular theory, it is believed that the additional polar groups can improve the interaction between the functionalized polymer and hydroxyl groups present at the surface of the cellulosic material. Examples of such functionalized polymers that can bond with a polar cellulosic surface include but are not limited to maleic anhydride functionalized polymers, terpolymers and blends, oxazoline and epoxide modified compounds such as glycidyl methacrylate functionalized polymers, carboxylic acid modified polymers such as ethylene acrylic acid, carboxylic acid derivative modified polymers, vinyl alkanoate modified polymers such as ethylene vinyl acetate, other acid anhydride modified polymers, ionic compound modified polymers, amine modified compounds and various combination or blends of the same.

The amount of polymer in the coating (wax) composition can be between about 0.5 wt % to about 5 wt %. For example, the amount of polymer in the wax composition can be about 0.5 wt % to about 1.5 wt %, or about 0.5 wt % to about 2.0 wt %, or about 0.5 wt % to about 3.0 wt %, or about 1.0 wt % to about 3.0 wt %, or about 0.5 wt % to about 4.0 wt %, or about 1.0 wt % to about 4.0 wt %. It has been determined that the inclusion of the polymer additive can make the wax coating harder which in turn enhances the rigidity and load bearing strength of the coated boards and boxes.

The amount of functional group modification of the polymer added to the wax composition, relative to the weight of the polymer, can be about 0.4 wt % to about 4 wt %, or about 0.4 wt % to about 5 wt %, or about 0.4 wt % to about 6 wt %, or about 1.0 wt % to about 4 wt %, or about 1.0 wt % to about 5 wt %, or about 1.0 wt % to about 6 wt %, or about 1.5 wt % to about 4 wt %, or about 1.5 wt % to about 5 wt %, or about 1.5 wt % to about 6 wt %, or about 2.0 wt % to about 4 wt %, or about 2.0 wt % to about 5 wt %, or about 2.0 wt % to about 6 wt %. Additionally or alternately, the amount of hydrophobic polymer backbone in the polymer additive can be at least about 94 wt % of the polymer additive, or at least about 95 wt %, or at least about 96 wt %. The functional group can be added by grafting the functional group to the polymer backbone, by incorporating monomers with functional groups to form a copolymer during polymer synthesis, or by any other convenient method.

In some aspects, the wax composition can consist essentially of one or more waxes, one or more polymer additives (functionalized polymers), and optionally one or more types of nanoparticles. In such aspects, the wax composition does not include other types of polymer products different from the functionalized polymers described herein. For example, a wax composition that consists essentially of waxes, functionalized polymers, and optionally nanoparticles can exclude the presence of compounds such as natural or synthetic rubber compounds.

In various aspects, the viscosity of a wax composition after incorporation of a functionalized polymer and/or nanoparticles can be sufficiently low to provide desirable properties when applying the wax composition to a paper (cardboard) surface. One way of characterizing the viscosity of a wax composition after addition of polymer and/or nanoparticles can be on a relative basis. In such aspects, the viscosity of the wax at 100° C. after addition of polymer, or after the addition of both polymer and nanoparticles, can be greater than the viscosity of the wax at 100° C. prior to addition of polymer (and optionally nanoparticles) by about 60% or less, or about 50% or less, or about 40% or less, or about 33% or less. For example, if a wax has a viscosity at 100° C. of 5 mm$^2$/s, the viscosity after addition of polymer (or both polymer and nanoparticles) can be about 8 mm$^2$/s or less in order to satisfy the requirement of the final viscosity being greater than the wax viscosity by 60% or less.

Additionally or alternately, another option for characterizing a wax composition, including a wax composition including a functionalized polymer (or including both polymer and nanoparticles) is based on the viscosity of the final composition. In this type of aspect, the viscosity of the wax composition at 100° C. can be about or about 7.5 cSt or less, or about 6 cSt or less, or about 5 cSt or less. Typically the viscosity of the wax composition can be at least about 3 cSt, or at least about 4 cSt.

In some aspects, the properties of a wax can be further enhanced by incorporating or dispersing inorganic particles in the melted wax/polymer. Particles that are sufficiently small, such as clay nanoparticles, can disperse or solubilize within a wax composition so that the nanoparticles do not represent a separate phase from the wax. Incorporation of inorganic particles into a wax matrix can enhance various properties of wax. However, the ability to effectively disperse or incorporate inorganic particles can be dependent on the compatibility of the particles with the wax. For wax compositions, the hydrophobic nature of the wax can make it difficult for the inorganic particles to disperse within the wax.

In some aspects, a superior coating composition for cellulosic substrates composed predominantly of wax can be achieved through incorporation of small amounts of plate-like inorganic nanoparticles into the wax composition. The platelike inorganic nanoparticles can be modified on the surface to render the nanoparticles partially hydrophobic, but not modified on the edge so that the nanoparticles have a hydrophilic character on the edge. Such nanoparticles can be incorporated into a wax composition together with small amounts of a compatibilizing polymeric additive, such as the functionalized polymer additives described above which correspond to a relatively hydrophobic backbone with a small percentage of hydrophilic functional groups. The polymeric additives described above can have a relatively hydrophobic character so that the polymeric additive is soluble in molten hydrophobic wax while also being able to bond with hydroxyl groups on both the cellulosic surface as well as the edges of the nanoparticles to provide compatibilization between the materials. This can allow for good dispersion of the nanoparticles in the wax composition. The combination of the well dispersed nanoparticles and compatibilizing polymer can significantly enhance the water barrier properties of the wax coating and also make the wax coating harder, which in turn enhances the rigidity and load bearing strength of products coated with the wax composition.

In contrast to some conventional methods for incorporating an inorganic filler into a wax or polymer matrix, the amount of nanoclay incorporated into the wax composition can correspond to a reduced or minimized amount. For example, the amount of nanoclay incorporated into the wax composition can be from about 0.001 wt % to about 0.5 wt % based on the weight of the wax composition, or about 0.005 wt % to about 0.5 wt %, or about 0.01 wt % to about 0.5 wt %, or about 0.025 wt % to about 0.5 wt %, or about 0.001 wt % to about 0.25 wt % based on the weight of the wax composition, or about 0.005 wt % to about 0.25 wt %, or about 0.01 wt % to about 0.25 wt %, or about 0.025 wt % to about 0.25 wt %, or about 0.001 wt % to about 0.1 wt % based on the weight of the wax composition, or about 0.005 wt % to about 0.1 wt %, or about 0.01 wt % to about 0.1 wt %, or about 0.025 wt % to about 0.1 wt %.

The plate-like inorganic nanoparticles can be composed of various materials. One suitable type of inorganic material is a nanoclay material. Suitable clays can include phyllosilicate clays, such as mica and smectite clays. Exemplary smectite clays include montmorillonite, hectorite, saponite, sauconite, beidellite, nontronite and synthetic smectites such as Laponite™. Graphite nanoparticles are another example of nanoparticles that can have an appropriate aspect ratio for use in enhancing the properties of a wax composition. Plate-like nanoparticles are defined as having an aspect ratio of at least about 25:1, or at least about 100:1. The aspect ratio refers to a diameter of the plate-like surface of the nanoparticle relative to thickness of an edge surface of the nanoparticle.

For aspects involving clay nanoparticles, or other nanoparticles with hydrophilic surfaces, the clay nanoparticles can be modified by adding a polymer to the clay surface to impart hydrophobic character to the clay. A variety of methods can be used to increase the hydrophobic character of a nanoclay. For example, after dispersing a clay in water to form a slurry, a nonionic polymeric hydrotrope can be added to the clay slurry. The amount of hydrotrope added to the slurry can be, for example, from about 1 weight percent to about 10 weight percent relative to the weight of the clay. The hydrotropes may be low-molecular-weight water-soluble polymers, polymers having limited water solubility, or mixtures thereof. The molecular weights can typically be less than 10,000, such as less than 5,000.

Examples of low-molecular-weight water-soluble polymers that are suitable hydrotropes for use in the present disclosure include, without limitation, polyvinyl alcohol, polyvinylpyrrolidone, polypropylene glycol, polybutylene glycol, methoxypolyethylene glycol, dimethoxypolyethylene glycol, polyethylene glycol, polyethylene glycol derivatives such as, polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl ether), polyethylene glycol butyl ether, polyethylene glycol dicarboxymethyl ether, polyethylene glycol divinyl ether, as well as copolymers of polyethylene glycol/polypropylene glycol, and polyethylene glycol/polybutylene glycol, and mixtures thereof.

Nonlimiting examples of polymers with low-water solubility that can be used as hydrotropes in the present disclosure include polyethylene glycol-block-polypropylene glycol-block-polyethylene glycol, polyethylene glycol-ran-polypropylene glycol, polyethylene glycol-ran-polypropylene glycol monobutyl ether, polypropylene glycol-block-polyethylene glycol-block-polypropylene glycol, polypropylene glycol monobutyl ether, polytetrahydrofuran, polytetrahydrofuran bis(3-aminopropyl), polyethylene-block-polyethylene glycol and polypropylene glycol, and mixtures thereof.

Optionally, ion exchange reactions with cationic surfactants can also be performed on the clay nanoparticles. Cationic surfactant modifying agents include amine salt-type, phosphonium salt-type, and sulfonium salt-type surfactants. Typically, the modifying agent is a quaternary ammonium salt. Such salts, which are well known in the art, include: dimethyl benzyl hydrogenated tallow ammonium, dimethyl benzyl octadecyl ammonium, methyl benzyl dihydrogenated tallow ammonium, dimethyl dihydrogenated tallow ammonium, trimethyl hydrogenated tallow ammonium, trimethyl octadecyl ammonium, dimethyl didodecyl ammonium, methyl trioctadecyl ammonium, dimethyl dioctadecyl ammonium, methyl tallow bis-2-hydroxyethyl ammonium, dimethyl dicoco ammonium, methyl dibenzyl coco ammonium, dibenzyl dicoco ammonium, tribenzyl coco ammonium, and mixtures thereof. In one aspect, the polymeric hydrotropes can be adsorbed onto the clay prior to adsorbing a cationic surfactant onto the surface of the clay. Alternatively, the clays may be exposed to a dispersion or mixture containing both the polymeric hydrotrope and the cationic surfactant such that hydrotrope absorption occurs substantially simultaneously with ion exchange. In this latter case, elevated temperatures can be used to speed the ion exchange process.

The components of the wax formulation can be combined through various different processes. For example, one way to make the wax (coating) composition can be by dispersing the organically modified nanoclay particles in molten wax and stirring at high speeds to enhance wetting of the clay platelets by wax. A polymer additive as described above can then be added to this suspension and the sample can be stirred at high speeds at temperatures that are at least about 10° C. to about 20° C. above the melt point of the polymer. The stirring can be performed for a sufficient time to fully dissolve the polymer and/or until the nanoclay particulates are seen to be fully dispersed and suspended in the molten wax at rest. In another aspect, the molten wax formulation can be further agitated with a high shear mixing equipment like a homogenizer that further allows for the clay platelets to be exfoliated, which in some instance can lead to improved performance of the coating. In still another aspect, the clay nanoparticles can be melt blended with the polymer additive during an extrusion process. The clay/polymer system can then be added to the molten wax and stirred at high speeds at temperatures that are at least about 10° C. to about 20° C. above the melt point of the polymer, which can then again be followed by high shear blending of the system. In yet another aspect, an option for making the wax (coating) composition can be to melt and homogenize the wax by stirring and heating it in a vessel at a temperature at least about 10° C. above the melting temperature of the wax. The polymer additive can then be blended into the wax at a temperature that is at least about 5° C. to about 20° C. above the melt temperature of the polymer, together with continuous stirring for sufficient time to fully dissolve the polymer in the molten wax at rest. Optionally, if it is desired to incorporate nanoclay particles into the wax composition, the nanoclay particles can be added to the wax composition containing the wax and polymer additive, and then stirred at a sufficient speed to disperse and incorporate the nanoclay particles.

Incorporation of polymers and/or particles into a wax composition to alter the properties of a wax has previously been performed. For example, coating compositions to provide a moisture barrier and/or an oil and grease barrier are commonly used on paper products, such as cardboard containers for transport of food products. Traditionally, wax coatings modified with polymers have found a significant use in this application. However, with an increase in price of such wax coatings over the years, there is a need for coatings that can provide improved water barrier protection, which can thereby allow the manufacturer to use a reduced or minimized weight of coating on a cardboard surface (or other cellulosic surface) while retaining a desired level of performance as a water barrier. Use of a reduced or minimized amount of wax can in turn provide cost savings to the customer and manufacturer.

A wax coating for a cellulosic material, e.g., corrugated cardboard, can also provide additional strength for the container. For commercial transport of food, it is desirable to use corrugated containers saturated with wax as rigid-when-wet corrugated container for packaging fresh fruits, vegetables, fresh iced poultry and other products. Such containers are typically coated with about 25-45 wt % wax compared to the weight of the unwaxed box. Unfortunately, the stacking strength of such waxed boxes can deteriorate rapidly under moist or wet conditions.

In an additional aspect, the disclosure provides a cellulosic material coated with a wax composition as described herein. In certain embodiments, the cellulosic material is completely saturated or coated with the wax composition. In additional embodiments, the cellulosic material is partially coated. In certain embodiments, the cellulosic material or article comprises from about 15% by weight to 60% by weight of a wax coating as described herein. In certain embodiments, the description provides a wax coated cellulosic article comprising a cellulosic surface including from about 25% by weight to about 45% by weight of a wax coating as described herein. In certain embodiments, the wax coated cellulosic article is a corrugated cardboard material.

In particular, the wax compositions described herein can be used to provide improvement in properties of coatings used for corrugated boxes, even though the wax composition used for production of the coating has a very broad molecular weight distribution, typically related to poor water proofing and hardness. More specifically, the description provides a range of wax compositions that can provide improved properties in corrugated box coatings, including enhanced wet strength and/or dry strength (strength and rigidity) of the coated box, and/or improved high temperature hardness and congealing point without any loss in the wet strength (rigidity of the box under wet conditions—measure of water proofing) property of the coating.

The wet strength test is a bench scale test that compares the compressive crush strength of a 2"×2" coupon of a corrugated cardboard that has been coated with wax at 40-43% wax pickup on the board and dipped in water at room temperature for 45 minutes to the crush strength of a 2"×2" coupon of an unwaxed corrugated cardboard. The wet strength is thus defined as:

$$\% \text{ Wet strength} = \frac{\text{Compressive crush strength of waxed and water exposed coupon}}{\text{Compressive crush strength of unwaxed coupon}} * 100$$

On the other hand, the dry strength test compares the increase in compressive crush strength of a 2"×2" coupon of a corrugated cardboard coated with wax at 40-43% wax pickup to the crush strength of a 2"×2" coupon of an unwaxed corrugated cardboard. The dry strength is defined as:

$$\% \text{ Dry strength} = \frac{\text{Crush strength of waxed coupon} - \text{crush strength of unwaxed coupon}}{\text{Crush strength of unwaxed coupon}} * 100$$

Wax pickup is defined as, $$\% \text{ Wax Pickup} = \frac{\text{Wt. of wax coated coupon} - \text{wt. of unwaxed coupon}}{\text{Wt of unwaxed coupon}} * 100$$

One option for improving the performance of wax coated containers under moist/wet conditions is to incorporate additives into the wax. While wax by itself provides strength and water barrier performance to the corrugated board, a polymer added to base wax can enhance the water barrier performance of the wax as well as enhancing the wet strength of a resulting coated product. The water barrier performance and strength can further be enhanced by addition of nanoparticles into the wax composition.

In an additional aspect, the disclosure provides articles or items formed from the wax compositions as described herein. In certain embodiments, the wax articles include a candle or a crayon.

In an additional aspect, the disclosure provides methods of making the wax compositions as described herein. The flexibility and availability of wax product streams that can be used to make the wax compositions as described herein thereby can reduce the cost of the wax product to the customer.

The components of the wax formulation can be combined through various different processes known to those of skill in the art. By way of nonlimiting example, the description provides a method of making the wax compositions as described herein according to the steps of admixing the wax components, melting and homogenizing the waxes by stirring and heating the mixture in a vessel at a temperature approximately 15° C. above the melting temperature of the higher melting wax, and blending an additive, e.g., a polymer or inorganic clay or ceramic, in the wax at a temperature of approximately 5 to 20° C. above the melt temperature of the polymer together with continuous stirring for sufficient time to fully dissolve the polymer in the molten wax at rest.

In certain embodiments, the method includes a step of admixing the wax components as well as the additives and heating to a temperature sufficient to completely melt all components in the mixture while stirring.

In still an additional aspect, the disclosure provides methods of using the wax compositions as described herein. In certain embodiments, the disclosure provides a method of forming a wax-coated article or material comprising providing the item and applying a coating of the wax composition as described herein. In certain embodiments, the disclosure provides a method of forming a wax-coated cellulosic material comprising providing a cellulosic article or material having a surface, forming or providing a wax composition as described herein and applying the wax composition to the cellulosic article or material. In certain embodiments, the cellulosic material is saturated with the wax composition. In certain additional embodiments, the cellulosic material is partially coated. In any of the embodiments described herein, the cellulosic material is corrugated cardboard.

Conventionally, for application involving saturating the corrugated cardboard with wax, the amount of additive added to base wax is kept low since additional use of polymer to the wax has a limited effect on enhancement in performance of the wax, while on the other hand it increases the viscosity of the wax formulation being used.

The application of wax to the corrugated cardboard is done through a cascade process in which molten wax is cascaded over corrugated cartons to fully saturate them with wax. The wax product viscosity is an important variable that can affect the amount of wax coating retained on the cardboard during the cascading operation. Higher wax viscosity leads to poor drainage of the wax during cascading operation leading to higher weight of the wax coating on the board, which in turn would increase the coating cost for the customers. Higher cascading temperatures may thus be required to achieve the same loading of wax on the board. Very high wax temperatures are however, undesirable in a cascading operation because they may drive out the base moisture in corrugated boards making them brittle. Hence, it is important to limit the increase in viscosity for a new product. With the use of a composition that has at least 15% of the composition >=C34 and at least 5% of the composition >=C38, the melt viscosity of the wax could be significantly high for the cascading operation. Hence, an upper limit in viscosity of the wax blend composition is determined at 7.5 cSt that may be useful in this application without being detrimental in the wax cascading operation.

The following non-limiting examples are provided to illustrate the disclosure.

EXAMPLES

The disclosure provides, in certain aspects, wax compositions and methods for making a wax coating composition for corrugated cardboards. In an exemplary embodiment, the disclosure provides saturating corrugated cardboard application by use of a unique composition that has historically been considered unsuitable for use in this application. The unique wax coating composition as described herein can have a very wide molecular weight distribution with a 95% carbon number spread of at least 18 carbon atoms. In an exemplary embodiment, the wax composition comprises at least 5% by weight of the composition having a carbon number <=C24, at least 5% by weight of composition having a carbon number >=C38 with at least 15% by weight of the composition having a carbon number >=C34 and a total n-paraffin content of <76% by weight, and a needle penetration at 104° F. (i.e., 40° C.) of <90 dmm.

As an example, shown below in Table 1 are two wax compositions (Wax A and Wax B) with a narrow molecular weight distribution of less than 15.5 (cf. Row #1: C#95% spread). These wax compositions (Wax A and B) are typical wax compositions that have been considered suitable for application for corrugated cardboard coatings. It can be seen that the wax compositions listed as Wax Product 1 through 9 provide wet and dry strength performance either within or, in most cases, better than the performance range of Waxes A and B.

Because both Wax A and B are considered suitable for performance in saturating wax application for corrugated cardboard, all Wax products 1 through 9 are considered at least equivalent to or better than the performance of existing products, even though they have a very wide carbon number spread greater than 18 carbon atoms with at least 5% by weight of the composition having a carbon number <=C24, at least 5% by weight of composition having a carbon number >=C38 with at least 15% by weight of the composition having a carbon number >=C34 and a total n-paraffin content of <76% by weight, which details the wide spread of the molecular weight of the molecules.

Also, a high n-paraffin content is typically considered to provide better water proofing, but it was surprisingly seen that wax compositions with less than 76% by weight n-paraffin content could still be provide equivalent or better wet strength properties (measure of water proofing of the wax composition) to the product. Finally the congealing point of all the wax products 1 through 9 with wide molecular weight distribution is seen to be higher than the congealing point of the Wax A and B, which provides benefit in high temperature properties of the coating. All the products listed below have at least 2% by weight of a polyethylene based polymer additive. The data below is obtained on corrugated cardboards coated with the wax compositions such that the weight of the wax coating is controlled between 40-43% of the weight of the cardboard.

In another example, described in Table 2, four products, all with wide molecular weight distributions of 22.4-23.1 were tested for wet edge crush strength performance and compared against the wet edge crush strength performance of a commercial product. Both the wax products tested and commercial products were coated on a corrugated cardboard at approximately the same basis weight. It was seen that in the case of the wax products 10 and 11, which were harder and had a needle penetration at 104° F. of less than 90 dmm, the wet strength performance of the wax product was better than the wet strength performance of the commercial product, whereas in the case of the products 12 and 13, where the needle penetration of the wax was softer and >90 at 104° F., the wet strength performance of the wax was worse in comparison to the commercial standard. It can also be seen in Table 1 that needle penetration of all the wax products is very low and the waxes are very hard, which again is an unexpected result, since as described in earlier references, a wider carbon number distribution is expected to reduce the hardness of wax. A harder wax in turn provides the benefit of improved dry strength properties.

Another property that can have an impact of needle penetration and water barrier properties of wax is the Oil in Wax content of the wax. The oil in wax content of the waxes listed in Wax Products 1 through 13 and specifically in Wax Products 10 through 13 are very close and within a very small range of each other. The oil in wax independently does not explain the differences in end-use properties of the waxes such as water proofing performance, needle penetration, dry strength of the coated cardboards, kinematic viscosity or congealing point.

TABLE 1

Comparison of commercial wax products (Wax A and Wax B) with exemplary wax compositions as described herein.

|  | Wax Prod 1 | Wax Prod 2 | Wax Prod 3 | Wax Prod 4 | Wax Prod 5 | Wax Prod 6 | Wax Prod 7 | Wax Prod 8 | Wax Prod 9 | Wax A | Wax B |
|---|---|---|---|---|---|---|---|---|---|---|---|
| Avg. C# | 35.8 | 33.4 | 31.0 | 28.6 | 34.0 | 31.6 | 32.1 | 29.7 | 31.0 | 26.8 | 30.2 |
| Total Paraffins MWD | 27.5 | 29.4 | 28.3 | 23.7 | 27.9 | 27.5 | 27.8 | 24.9 | 27.1 | 13.8 | 17.2 |
| % C24− | 6.5 | 12.9 | 19.3 | 25.8 | 8.9 | 15.3 | 14.0 | 20.5 | 16.9 | 28.2 | 9.3 |
| % C34+ | 63.4 | 47.9 | 32.5 | 17.1 | 50.6 | 35.2 | 38.3 | 22.9 | 31.4 | 4.4 | 23.0 |
| % C38+ | 42.0 | 31.6 | 21.2 | 10.8 | 32.0 | 21.6 | 23.6 | 13.3 | 19.0 | 0.8 | 5.4 |
| % n-Paraffins | 57.4 | 63.3 | 69.3 | 75.2 | 62.2 | 68.1 | 66.9 | 72.9 | 69.6 | 80.0 | 76.0 |
| NP (dmm) @104 F. | 32.5 | 44.5 | 50.3 | 53.0 | 32.8 | 39 | 34.8 |  |  | 57.6 | 34 |
| KV (mm2/s) @100 C. | 7.40 | 6.57 | 5.63 | 4.93 | 6.77 | 5.97 | 6.06 | 5.3 | 5.5 | 4.38 | 5.37 |
| % Dry strength | 73.7 | 53.3 | 73.3 | 54.5 | 68.0 | 79.6 | 68.9 | 69.1 | 56.1 | 63.1 | 53.6 |
| % Wet Strength | 42.8 | 41.5 | 41.4 | 51.9 | 48.2 | 54.9 | 50.0 | 55.6 | 57.9 | 42.2 | 39.2 |

TABLE 1-continued

Comparison of commercial wax products (Wax A and Wax B) with exemplary wax compositions as described herein.

| | Wax Prod 1 | Wax Prod 2 | Wax Prod 3 | Wax Prod 4 | Wax Prod 5 | Wax Prod 6 | Wax Prod 7 | Wax Prod 8 | Wax Prod 9 | Wax A | Wax B |
|---|---|---|---|---|---|---|---|---|---|---|---|
| CP (° F.) | | 68.8 | 66.1 | 58.3 | | 66.3 | 68 | | | 55 | 60.3 |
| OIW (%) | <0.75 | <0.75 | <0.75 | <0.75 | <0.75 | <0.75 | <0.75 | <0.75 | <0.75 | <0.5 | <0.5 |
| % Polymer | 2% | 2% | 2% | 2% | 2% | 2% | 2% | 2% | 2% | 2% | 2% |

MWD—Molecular weight distribution - 95% C# spread
NP—Needle Penetration
KV—Kinematic Viscosity
CP—Congealing Point
OIW—Oil in Wax

TABLE 2

Exemplary wax compositions as described herein.

| | Wax Product 10 | Wax Product 11 | Wax Product 12 | Wax Product 13 |
|---|---|---|---|---|
| Avg. C# Total Paraffins | 30.4 | 30.0 | 30.4 | 30.4 |
| Molecular wt. Distribution - 95% Spread | 23.1 | 23.0 | 22.4 | 22.4 |
| % C24− | 15.1 | 16.4 | 13.6 | 13.6 |
| % C34+ | 24.3 | 22.0 | 23.2 | 23.2 |
| % C38+ | 11.2 | 10.7 | 10.5 | 10.5 |
| % n-Paraffins | 61.5 | 62.8 | 59.1 | 59.1 |
| Needle Penetration (dmm) @104 F. | 56.0 | 75.0 | 96.0 | 95.0 |
| Kin. Viscosity (mm2/s) @100 C. | 5.80 | 6.19 | 6.59 | 6.52 |
| Congealing Point (° F.) | 61.9 | 61.7 | 60.3 | 61.4 |
| water proofing wet edge crush strength (lb/in) of wax product | 15.3 | 28.1 | −15.5 | 13 |
| water proofing wet edge crush strength (lb/in) of a commercial product | 15.2 | 24 | 18.8 | 13.9 |
| Oil in Wax (%) | 0.33 | 0.93 | 0.91 | 1.28 |
| % Polymer additive | 2% | 2% | 2% | 2% |

TABLE 3

Exemplary wax compositions at extreme ends of the range of compositions described in Hudson et.al. (U.S. Pat. No. 7,445,648). Needle penetration values measured on the exemplary wax compositions made.

| | Wax Product 14 | Wax product 15 |
|---|---|---|
| Avg. C# Total Paraffins | 31.8 | 33.1 |
| Molecular wt. Distribution - 95% Spread | 16.2 | 20.3 |
| % C24− | 2.7 | 2.3 |
| % C34+ | 30.0 | 39.9 |
| % C38+ | 6.2 | 15.7 |
| % n-Paraffins | 45.0 | 46.5 |
| Needle Penetration (dmm) @104 F. | 318.3 | 223.3 |
| Kin. Viscosity (mm2/s) @100 C. | 3.8 | 4.3 |
| Congealing Point (° F.) | | |
| Oil in Wax (%) | 1.5-2.0 | 1.5-2.0 |
| % Polymer additive | 0% | 0% |

Figure 2:
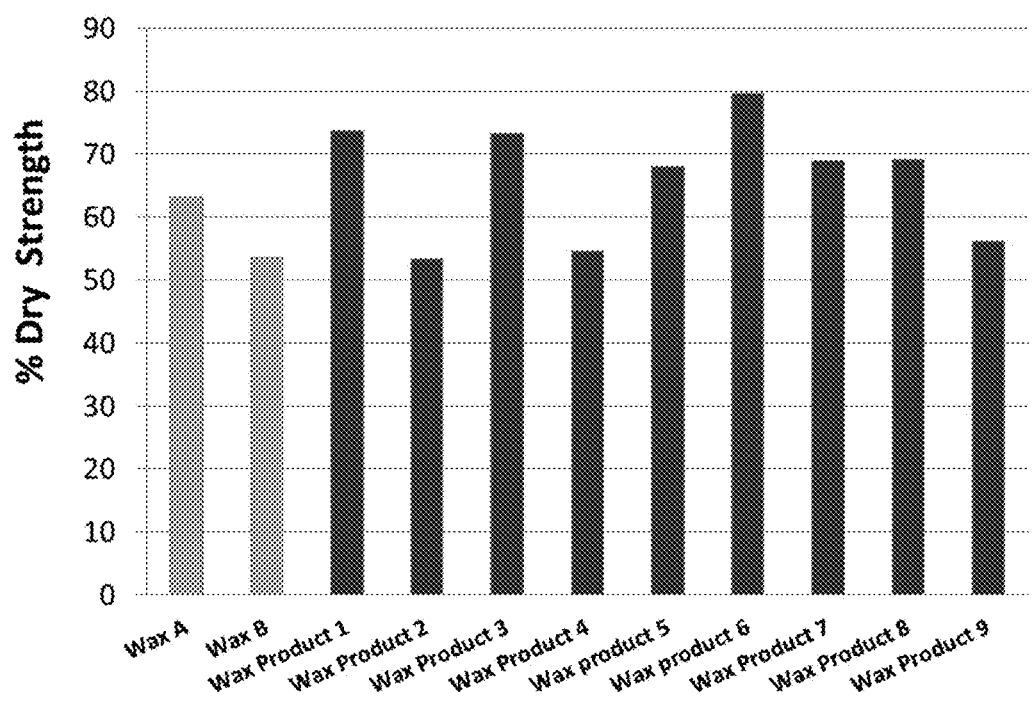
FIG. 2. Illustrates the dry strength properties of exemplary wax compositions as described herein ("Wax Products" 1, 2, 3, 4, 5, 6, 7, 8 and 9) in comparison to commercially available products, "Wax A" and "Wax B."

FIGS. 1 and 2 also illustrate the wet and dry strength properties of Wax products 1 through 9 in comparison to Wax A and Wax B. It can be seen that the wax compositions as described herein have similar or enhanced strength when compared to that of current commercially available wax products.

Figure 3:
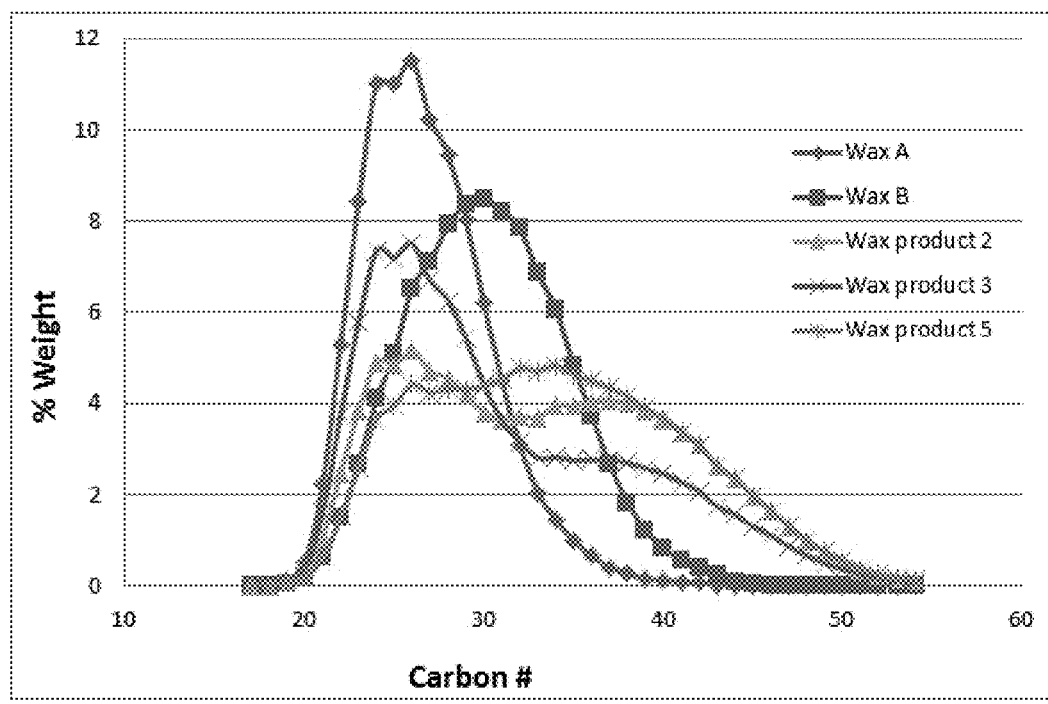
FIG. 3. Shows the total paraffin carbon number distributions for several exemplary wax compositions as described herein ("Wax Products" 2, 3, and 5).

FIG. 3 shows the total paraffin carbon number distributions for several exemplary wax compositions as described herein ("Wax Products" 2, 3, and 5). The distributions for Wax product 2, 3 and 5 clearly show a very wide distribution of molecules.

The present description and examples provide unique wax compositions that can be used to coat, e.g., corrugated cardboards as well as other materials and uses. The wax products provide a number of significant advantages, including, inter alia:

i) The flexibility to formulate a wax product for use as a corrugated cardboard coating with a very broad molecular weight distribution, which conventional wisdom teaches is unsuitable for this application, thereby providing the flexibility to blend widely different wax streams to develop the coating composition. With the rationalization of group 1 refining capacity around the world and sharply declining availability of high quality wax streams, a flexibility to use different wax streams to make a suitable product provides a significant advantage and is essential for the sustainability of the corrugating wax business:

ii) Improved performance of the coating in providing equivalent or better dry strength and especially dry strength at a higher temperature as compared to the products available in the market, helping the box maintain its mechanical integrity and stacking strength, especially at high temperatures. This improvement is also seen in the improvement in hardness of the coating (especially at higher temperatures) leading to an improvement in structural integrity and load bearing capacity of the original box; and iii) Benefit in a higher congealing point of the corrugating wax product, again benefiting the high temperature properties, such as oil bleed, appearance and friction coefficient of the coating on the corrugated box.

REFERENCES

The following references are incorporated herein by reference in their entirety for all purposes.

1. Young F. X., "Practical Applications of Gas Chromatography in Paints and Coatings Industry", Analysis of Paints and Related Materials: Current Techniques for Solving Coating Problems, ASTM STP 1119, American Society for Testing and Materials, Philadelphia, 1992, 105-124.

2. Meyer, G., "Interactions between chain length distributions, crystallization behavior and needle penetration of paraffin waxes", Erdol-Erdgas-Kohle Journal, 2006, 122.Jg, 1, S.16-18.

3. "Method of producing modified polyethylene wax", U.S. Pat. No. 4,039,560.

4. "Thermal degradation of polyolefins in the presence of a metal salt carboxylic acid", U.S. Pat. No. 3,332,926.

5. Aubee N., Lam P., Marshall S., "A new family of sHDPE polymers for enhanced moisture barrier performance", Journal of Plastic Film and Sheeting, 2006, 22, 315.

6. Todd W., "Variables that affect/control high density polyethylene film oxygen/moisture barrier", ANTEC 2003.

7. Hudson, C. W., Kent, C. J., Hennessy, A. P., "Wax blends for candles with improved properties", U.S. Pat. No. 7,445,648.

PCT and EP Clauses:

1. A wax composition comprising a sufficient amount of paraffin waxes having a 95% carbon number spread of at least 18 carbon atoms, wherein the wax composition has a needle penetration value at 40° C. of about 90 dmm or less.

2. The wax composition of clause 1, wherein the wax composition comprises at least 5% by weight of paraffin waxes having a carbon number of 24 or less.

3. The wax composition of clause 2, wherein the wax composition comprises at least 5% by weight of paraffin waxes having a carbon number of 38 or more.

4. The wax composition of clause 3, wherein the wax composition comprises at least 15% by weight of paraffin waxes having a carbon number of 34 or more.

5. The wax composition of clause 4, wherein the wax composition comprises a total n-paraffin content of less than about 76% by weight.

6. The wax composition of clause 5, wherein the wax composition has a total wax blend kinematic viscosity of about 7.5 cSt or less at 100° C.

7. The wax composition of clause 6, wherein the wax composition has a total wax blend kinematic viscosity of from about 4.3 cSt to about 7.5 cSt at 100° C.

8. The wax composition of clause 1, wherein the composition further comprises from about 0.01% by weight to about 10% by weight of an additive or combination of additives.

9. The wax composition of clause 8, wherein the additive is a polymer, co-polymer or inorganic material.

10. The wax composition of clause 9, wherein the additive is polyethylene.

11. The wax composition of clause 10, wherein the polyethylene is a functionalized polyethylene.

12. The wax composition of clause 10, wherein the composition comprises about 2% by weight of polyethylene.

13. A wax coated cellulosic article comprising a cellulosic surface including from about 25% by weight to about 45% by weight of the wax coating of clause 1.

14. The wax coated cellulosic article of clause 13, wherein the cellulosic article is a corrugated cardboard material.

15. A method of manufacturing a wax coated cellulosic material comprising the steps of providing a cellulosic material, and applying the wax composition of clause 1.

While preferred embodiments of the disclosure have been shown and described herein, it will be understood that such embodiments are provided by way of example only. Numerous variations, changes and substitutions will occur to those skilled in the art without departing from the spirit of the disclosure. Accordingly, it is intended that the appended claims cover all such variations as fall within the spirit and scope of the disclosure.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A wax composition comprising a sufficient amount of paraffin waxes having a 95% carbon number spread of at least 23 carbon atoms, at least 10.8% by weight of paraffin waxes having a carbon number of 38 or more, wherein the wax composition has a needle penetration value at 40° C. of about 90 dmm or less; and wherein the wax composition has a total wax blend kinematic viscosity of about 4.93 cSt or more at 100° C.

2. The wax composition of claim 1, wherein the wax composition comprises at least 5% by weight of paraffin waxes having a carbon number of 24 or less.

3. The wax composition of claim 2, wherein the wax composition comprises at least 5% by weight of paraffin waxes having a carbon number of 38 or more.

4. The wax composition of claim 3, wherein the wax composition comprises at least 15% by weight of paraffin waxes having a carbon number of 34 or more.

5. The wax composition of claim 4, wherein the wax composition comprises a total n-paraffin content of less than about 76% by weight.

6. The wax composition of claim 5, wherein the wax composition has a total wax blend kinematic viscosity of about 4.93 cSt to about 7.5 cSt at 100° C.

7. The wax composition of claim 6, wherein the wax composition has a total was blend kinematic viscosity of from about 5.3 cSt to about 7.5 cSt at 100° C.

8. The wax composition of claim 1, wherein the composition further comprises from about 0.01% by weight to about 10% by weight of an additive or combination of additives.

9. The wax composition of claim 8, wherein the additive is a polymer, co-polymer or inorganic material.

10. The wax composition of claim 9, wherein the additive is polyethylene.

11. The wax composition of claim 10, wherein the polyethylene is a functionalized polyethylene.

12. The wax composition of claim 10, wherein the composition comprises about 2% by weight of polyethylene.

13. A wax composition comprising at least 5% by weight of paraffin waxes having a carbon number of 24 or less, at least 10% by weight of paraffin waxes having a carbon number of 38 or more, at least 15% by weight of paraffin waxes having a carbon number of 34 or more, and a total n-paraffin content of less than about 76% by weight, wherein the wax composition has a 95% carbon number spread of at least 23 carbon atoms and a needle penetration value at 40° C. of about 90 dmm or less; and wherein the wax composition has a total wax blend kinematic viscosity of about 4.93 cSt or more at 100° C.

14. The wax composition of claim 13, wherein the wax composition has a total wax blend kinematic viscosity of about 4.93 cSt to about 7.5 cSt at 100° C.

15. The wax composition of claim 6, wherein the wax composition has a total was blend kinematic viscosity of from about 5.3 cSt to about 7.5 cSt at 100° C.

16. The wax composition of claim 13, wherein the composition further comprises from about 0.01% by weight to about 10% by weight of an additive or combination of additives.

17. The wax composition of claim 16, wherein the additive is a polymer, co-polymer or inorganic material.

18. The wax composition of claim 17, wherein the additive is polyethylene.

19. The wax composition of claim 18, wherein the composition comprises about 2% by weight of polyethylene.

20. The wax composition of claim 18, wherein the polyethylene is a functionalized polyethylene.

* * * * *